United States Patent Office 3,702,882
Patented Nov. 14, 1972

3,702,882
PROCESS FOR THE PREPARATION OF FINE SIZED MAGNESIUM ALUMINATE SPINEL
Richard R. Rettew, Laurel, Md., David G. Wirth, Jr., Golden, Colo., and Rimantas Glemza, Baltimore, Md., assignors to W. R. Grace & Co., New York, N.Y.
No Drawing. Continuation-in-part of abandoned application Ser. No. 784,168, Nov. 16, 1968. This application Apr. 15, 1971, Ser. No. 134,435
Int. Cl. C01f 7/02
U.S. Cl. 423—600    3 Claims

ABSTRACT OF THE DISCLOSURE

A process for preparing magnesium aluminate ($MgAl_2O_4$)

powder which comprises thermally decomposing salts, solutions, or slurries in a high temperature fluid energy mill. The product, after suitable calcination, can be cold pressed and sintered to 97–99% of theoretical density at temperatures of 100–250° C. lower than is required by conventional processes.

CROSS REFERENCE TO OTHER APPLICATIONS

This application is a continuation-in-part of application Ser. No. 784,168 filed Nov. 16, 1968 which has been abandoned.

BACKGROUND OF THE INVENTION

It has been shown that fine sized powders exhibit unique properties when compared to powders of the same composition but of larger sizes. The small particles sinter to high densities at lower temperatures, form solid solutions at lower temperatures and form strong ceramic bodies by virtue of their small grain size. Pure powders, with an average particle size of less than 1 micron are difficult to prepare by conventional techniques and are often prohibitively expensive in raw material and processing costs. The conventional wet chemical preparatory techniques lead to problems in washing, filtering, drying, preventing agglomeration, and comminuting the aggregates formed.

BROAD DESCRIPTION OF THE INVENTION

We have found that magnesium aluminate ($MgAl_2O_4$) spinel can be prepared by the thermal decomposition of decomposable salts, solutions, or slurries in a high temperature fluid energy mill. The resulting powder varies from X-ray amorphous to microcrystalline. The fluid energy mill converts the decomposable feed materials into the magnesium aluminate and does away with the costly and time consuming steps of washing. The rapid thermal treatment in the fluid energy mill removes volatiles to a low level without crystalline growth.

The magnesium aluminate spinel, thus prepared, after suitable calcination, can be cold-pressed and sintered to 97–99% of theoretical density at temperatures of from 100–250° C. lower than those in current practice. A mechanically strong body can be prepared from these fine grained magnesium aluminate spinel powders.

Magnesium aluminate spinel is a ceramic material with a variety of uses. It is cubic and hence can be made transparent. It has a higher melting point than alumina and can be used to replace the alumina when resistance to mechanical abrasion is not critical.

DESCRIPTION OF THE PREFERRED EMBODIMENT

We have formed magnesium aluminate spinel bodies of a fine grain size, superior mechanical properties, and superior surface finish from a microcrystalline magnesium aluminate spinel powder. The powder is prepared from thermally decomposable salts, solutions of these salts, or aqueous ammoniacal slurries of the hydroxy oxides, in a fluid energy mill. The magnesium aluminate spinel bodies have a density of 97–99% of theoretical.

The powders prepared by our novel process differ from these currently in use in that they are submicron in size and much more sinterable. Conventionally magnesium aluminate spinel is prepared by either fusion of magnesium carbonate ($MgCO_3$) and alumina ($Al_2O_3$) at temperatures in excess of 2000° C. or by calcination of magnesium carbonate and alumina at temperatures up to 1700° C. The large particles thus obtained require considerable grinding to reduce the size to about one micron. The ground powder is then cold pressed and sintered to 95–97% of theoretical density at temperatures of 1750° C. or higher. The resulting grain size is about 20–50 microns.

The exceedingly small crystallite size of our magnesium aluminate spinel (a few hundred angstrom units) is made possible by the very rapid thermal treatment in the fluid energy mill. The fact that we obtain only one crystal phase magnesium aluminate ($MgAl_2O_4$) rather than

in this rapid treatment or upon mild calcination of the product recovered from the fluid energy mill results from the intimacy of mixing in the feedstock. Since the spinel precursors are in very intimate contact, the diffusion paths are very short and extensive calcination is not required for thermal diffusion to effect the formation of the spinel phase.

The use of fluid energy milling to reduce particle size is well known. High energy milling effects comminution by interparticle abrasion. Using this technique, the limited particle size obtained is approximately 1 micron excluding fines which constitute but a small part of the product. In addition to size reduction, we have utilized the mill to prevent the growth of particles. Using conventional drying conditions, small particles tend to agglomerate and must be comminuted further if such small particles are desired. In our process, the growth of crystallites and agglomeration of particles is minimized.

The fluid energy mill is particularly suitable for production of high surface energy powders. For the most part, any type of aging is detrimental in preparing fine size high surface energy particles. If one attempts to dry hydrogels or sols by conventional heat treatments, such as oven drying, spray drying, forced air, etc., time and temperature treatment can cause particle growth, crystallization, loss of surface area, and porosity as well as particle densification. Dehydration in a fluid energy mill is extremely rapid involving higher temperature for much shorter periods of time. These conditions are sufficient to produce the spinel as a fine high surface energy powder desirable for many industrial uses.

Another advantage of our novel process is the elimination of filtering and washing steps. The difficulty of washing freshly precipitated hydrous oxides is well known. The materials pass through the coarse filters, plug fine filters, and often requires extensive processing. The decomposition of magnesium nitrate and aluminum nitrate or other decomposable salts in a fluid energy mill eliminates the washing and drying steps.

The first step of our process is the selection of the proper magnesium and aluminum salts to be used in preparing the magnesium aluminate. We prefer to use magnesium nitrate and aluminum nitrate as the reactants.

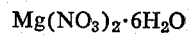

and $Al(NO_3)_3 \cdot 9H_2O$ are preferred. However, other decomposable magnesium and aluminum salts also give suitable results. Examples of these salts include magnesium formate, acetate, nitrite, etc. and aluminum formate, acetate, nitrite, etc.

In order to assure that the product recovered is magnesium aluminate spinel, the $MgO:Al_2O_3$ ratio is maintained between about 1.005 and 1.015. The feed to the fluid energy mill is normally prepared by dissolving the magnesium nitrate and aluminum nitrate salts in water. The salts may be precipitated with ammonia in a hydrous oxide reactor and the product fed to the mill. In this case, the pH of the reactant slurry is adjusted to about 9 to 10.5. However, satisfactory results have been obtained when the proper proportions of magnesium nitrate hexahydrate, and aluminum nitrate nonahydrate are mixed dry and the mixture fed into a fluid energy mill as a dried product. In addition, a satisfactory product contaminated with a minimum amount of alumina was recovered by milling alumina trihydrate and magnesium nitrate hexahydrate as a dry powder.

After the method of preparing the material is selected, the dry mix, solution, or slurry is fed to the fluid energy mill. The temperature of operation of the fluid energy mill depends on the design of the mill and on the type of reaction desired. We have modified the mill for use in our novel process to operate at inlet temperatures of 760° to 871° C. and outlet temperatures of 343° to 538° C.

The fluid energy mill, as currently designed, may be operated in the presence of steam or air. When operation with steam is utilized, the pressure of the steam feed is in the range of 50 to 175° p.s.i.g.

As pointed out above, the feed to the fluid energy mill may be solids, solutions, or slurries of aluminum nitrate and magnesium nitrate, the hydrous oxides, or alumina and magnesium nitrate. When an 8 inch fluid energy mill is used, for example, solids may be fed at the rate of 50–300 grams per minute with the feed rate of 100–200 grams per minute being preferred. Solutions of magnesium nitrate and aluminum nitrate may be fed at the rate of 50–300 ml. per minute, preferably 120–220 ml. per minute. Slurries of magnesium hydroxide and aluminum hydroxide, prepared in the hydrous oxide reactor by reaction of solutions of the salts with ammonia may be fed to the mill at a rate of 50–300 ml. per minute, preferably 120–200 ml. per minute.

The most satisfactory method of expressing the feed rate is as the ratio of the pounds of steam to pounds of product. This ratio is independent of the size of the mill and is calculated by first calculating the pounds of steam per hour fed to the mill, which is calculated from the size, number of nozzles and other physical characteristics of the mill. This calculation gives the pounds of steam per hour. The feed rate of the material to be milled, as pounds of feed per hour, is controlled to give the desired ratio to pounds of steam to pounds of product.

Our process is operable at ratios in the range of 10 to 60 preferably 20 to 40.

Obviously, the operating temperature and pressure and the feed rate are subject to change with redesign of the mill to increase the diameter and/or increase the maximum operating temperature. The limits set out above are typical for current equipment.

If it is desired to prepare ceramic bodies from the spinel, the powder recovered from the fluid energy mill is calcined and sintered. Calcination is carried out at temperatures of 650–1100° C. for periods of about 1 to 2 hours. The calcined product, after pressing in the desired form, is sintered at temperatures of 1450–1650° C. for periods of 1 to 2 hours. When the calcined material is formed, it is compacted into green bodies and at pressures of at least 10,000 p.s.i.

The product recovered from the milling process is a fine size highly reactive magnesium aluminate spinel. The powder is characterized by an ultimate particle size in the millimicron range, high purity, and homogeneity. When the spinel powder is calcined and formed, the body recovered can be sintered to a density of 97–99% of theoretical. The grain size of the particles making up the bodies is in the micron size range.

Our invention is further illustrated by the following specific but non-limiting examples.

Example 1

A total of 1026 grams of magnesium nitrate

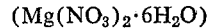
$(Mg(NO_3)_2 \cdot 6H_2O)$ and 300 grams of aluminum nitrate $(Al(NO_3)_3 \cdot 9H_2O)$ were dissolved in water and the solution was diluted to 15 liters. The atom ratio of magnesia to aluminum in the solution was 1 to 2. The solution was neutralized in the hydrous oxide reactor with 29% ammonia to a pH of 11.2. The slurry was dewatered by filtration, and the wet cake dried at room temperature. The solids were crushed to below 8 mesh, and fed into an 8 inch fluid energy mill operated in the presence of steam. The solids were fed at the rate of 150 grams per minute. The mill was operated at 850° C. The product from the mill was analyzed. It contained principally magnesium aluminate $(MgAl_2O_4)$ and contained 23.1% volatiles and 1.6% electrolytes calculated as ammonium nitrate.

Example 2

In this run, 1875 grams of aluminum nitrate $(Al(NO_3)_3 \cdot 9H_2O)$ and 640 grams of magnesium nitrate $(Mg(NO_3)_2 \cdot 6H_2O)$ were mixed dry and the mixture was allowed to stand in a closed container for three days. The mixture was then fed into an 8 inch fluid energy mill operated in the presence of steam. The powder was fed to the mill at a rate of 100 grams per minute. The mill was operated at 483° C. The product from the mill was microcrystalline magnesium aluminate containing 22.2% volatiles and 2% electrolytes.

Example 3

This example illustrates the preparation of magnesium aluminate from a dry mixture of alumina trihydrate and magnesium nitrate.

A total of 1750 grams of alumina trihydrate

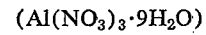
$(Al_2O_3 \cdot 3H_2O)$ and 350 grams of magnesium nitrate $(Mg(NO_3)_3 \cdot 6H_2O)$ were mixed dry. The mixture was fed into a fluid energy mill at the rate of 150 grams per minute. The mill was operated at 880° F. The product from the mill was analyzed and found to contain 9.1% volatiles and 0.6% electrolytes calculated as magnesium nitrate. The product also contained microcrystalline magnesia. After firing at 1650° C., the principal crystalline products were magnesium aluminate $(MgAl_2O_4)$ and $\gamma$-alumina.

Example 4

This example illustrates the preparation of the magnesium aluminate from solutions of aluminum nitrate and magnesium nitrate.

Solutions of aluminum nitrate $(Al(NO_3)_3 \cdot 9H_2O)$ and magnesium nitrate $(Mg(NO_3)_2 \cdot 6H_2O)$  were prepared to have a solids content of 8.12% and an MgO to $Al_2O_3$ mole ratio of 1.005 to 1. The solution was fed to an 8 inch fluid energy mill operated in the presence of steam at 832° C. inlet temperature and 543° C. outlet temperature. The solution was fed at a rate of 100 ml. per minute. The grind pressure was 175 p.s.i. The powder recovered had a surface area (by the well known Bruaner Emmett Teller technique-B.E.T.) of 28 square meters per gram and a very weak magnesium aluminate X-ray diffraction pattern. The product was calcined at 800° C. for 2 hours. The surface area of the product recovered after calcination is 20.7 square meters per gram. The crystallites had a diameter of 300 angstroms. After calcination at 1000° C. and compacting at a pressure of 25,000 p.s.i., the compact was sintered at 1650° C. for two hours. The density was 97% of theoretical. The average grain size of the particle making up the compact was 8 to 10 microns.

Example 5

In this run, a solution was prepared using the same ratios as in Example 4 and was reacted with ammonia in an hydrous oxide reactor.

A solution of aluminum nitrate $(Al(NO_3)_3.9H_2O)$ and $(Mg(NO_3)_2.6H_2O)$ was prepared to have a solid content of 8.12% (as oxides) and a magnesia to alumina ratio of 1.005 to 1. The solution was fed to an hydrous oxide reactor with 5 molar ammonia $(NH_3)$. The pH of the effluent was 9.5. The slurry was fed to an 8 inch fluid energy mill operated on superheated steam at a temperature of 777° C. The slurry was fed at a rate of 90–100 ml. per minute. The outlet temperature of the mill was 1270° F. The grind pressure was 150 p.s.i.

The powder collected from the mill had a BET surface area of 66 square meters per gram. After calcination at 800° C. for two hours, the surface area was 33 square meters per gram and the crystallite size, by X-ray diffraction, was 90 angstroms. The product was calcined at 750° C. and pressed at 25,000 p.s.i. The compact recovered was fired at 1,500° C. for 2 hours, and had a density of 98% of theoretical. The average grain size of the particles making up the compact was 6–8 microns.

Obviously, many modifications and variations of the invention may be made without departing from the essence and scope thereof and only such limitations should be applied as are indicated in the appended claims.

What is claimed is:

1. A process for preparing magnesium aluminate spinel which comprises:
   (a) preparing a mixture of thermally decomposable magnesium and aluminum salts selected from the group consisting of the nitrates, the formates, the acetates, and the nitrites in quantities such that the MgO to $Al_2O_3$ ratio in the mixture is 1.005 to 1.015.
   (b) decomposing and grinding by feeding said mixture to a fluid energy mill operated in the presence of steam at a pressure of 50 to 175 p.s.i.g. and an inlet temperature of above about 760° C. at a rate such that the ratio of pounds of steam to pounds of product is in range of 10 to 60 and,
   (c) calcining the mill product at temperatures of 650° to 1100° C. for periods of 1 to 2 hours and recovering the magnesium aluminate spinel product.

2. The process according to claim 1 wherein the mixture is fed to the mill at a rate such that the ratio of pounds of steam to pounds of product is in the range of 20 to 40.

3. A process for preparing magnesium aluminate spinel which comprises:
   (a) mixing dry alumina trihydrate and magnesium nitrate in quantities such that the MgO to $Al_2O_3$ ratio in the mixture is 1.005 to 1.015,
   (b) decomposing and grinding by feeding the mixture to a fluid energy mill operated at a temperature of at least about 800° C. in the presence of steam at a pressure in the range of 50 to 175 p.s.i.g. at a rate such that the ratio of pounds of steam to pounds of product is in the range of 10 to 60.
   (c) calcining the effluent from the mill at temperatures of 650° to 1100° C. and recovering the magnesium aluminate spinel product.

References Cited
UNITED STATES PATENTS

| 3,514,252 | 5/1970 | Levy et al. | 23—22 |
| 2,590,219 | 3/1952 | Stephanoff | 241—5 |
| 3,317,145 | 5/1967 | Stephanoff | 241—5 |
| 3,304,153 | 2/1967 | Bakkar et al. | 23—52 |
| 3,530,209 | 9/1970 | Ho | 23—52 |
| 3,457,033 | 7/1969 | Gatti et al. | 23—52 |

HERBERT T. CARTER, Primary Examiner

U.S. Cl. X.R.

241—5